United States Patent
Prasad

(10) Patent No.: US 8,868,706 B2
(45) Date of Patent: Oct. 21, 2014

(54) VENDOR GATEWAY TECHNOLOGY

(75) Inventor: Annadata V. Prasad, Evergreen, CO (US)

(73) Assignee: Bank of America Corporation, Charlotte, NC (US)

( * ) Notice: Subject to any disclaimer, the term of this patent is extended or adjusted under 35 U.S.C. 154(b) by 408 days.

(21) Appl. No.: 12/201,213

(22) Filed: Aug. 29, 2008

(65) Prior Publication Data

US 2010/0057896 A1   Mar. 4, 2010

(51) Int. Cl.
*G06Q 10/10* (2012.01)

(52) U.S. Cl.
CPC .................................. *G06Q 10/10* (2013.01)
USPC ........... 709/223; 709/201; 709/203; 709/219; 370/235; 370/398; 370/401

(58) Field of Classification Search
USPC ......................................................... 709/223
See application file for complete search history.

(56) References Cited

U.S. PATENT DOCUMENTS

| | | | |
|---|---|---|---|
| 2003/0023604 A1* | 1/2003 | O'Brien et al. ............... | 707/100 |
| 2003/0081618 A1* | 5/2003 | Deng ............................ | 370/398 |
| 2004/0103308 A1* | 5/2004 | Paller .......................... | 713/201 |
| 2004/0167865 A1* | 8/2004 | Alemany ....................... | 707/1 |
| 2005/0135387 A1* | 6/2005 | Rychener et al. ............. | 370/401 |
| 2005/0165885 A1* | 7/2005 | Wong ........................... | 709/201 |
| 2005/0165910 A1* | 7/2005 | Kilian .......................... | 709/219 |
| 2007/0027974 A1* | 2/2007 | Lee et al. ..................... | 709/223 |
| 2007/0118460 A1* | 5/2007 | Bauerschmidt et al. ....... | 705/37 |
| 2008/0034080 A1* | 2/2008 | Chamaraj et al. ............. | 709/223 |
| 2008/0301053 A1* | 12/2008 | Tserkovny et al. ............ | 705/54 |
| 2009/0112978 A1* | 4/2009 | Owen et al. .................. | 709/203 |
| 2009/0172801 A1* | 7/2009 | Friedrich et al. .............. | 726/12 |

* cited by examiner

*Primary Examiner* — Hamza Algibhah
*Assistant Examiner* — Natisha Cox
(74) *Attorney, Agent, or Firm* — Weiss & Arons LLP; Michael A. Springs, Esq.

(57) ABSTRACT

Apparatus and methods for communicating between a gateway server and a plurality of other servers. The apparatus and methods may involve receiving information requests from the plurality of other servers. Each of the plurality of other servers may provide a platform for a different development environment. The apparatus and methods may further involve using the gateway server to generate an identification tag for each information request received from each of the plurality of other servers. The approved methods may include receiving a response to such information requests. In addition, the apparatus and methods may include associating the response received to the information request to which the response is responsive.

16 Claims, 4 Drawing Sheets

VENDOR GATEWAY TECHNOLOGY

FIELD OF TECHNOLOGY

Aspects of the disclosure relate to business-to-business integration.

BACKGROUND

Business to Business ("B2B") is a term used in electronic commerce to describe the automated communications between trading partners as a part of the business process. In one exemplary exchange of information between a vendor and a business entity, the vendor, who may be one of a number of vendors associated with the business entity, will query one of a number of environment servers—i.e., a server that provides a platform for a particular development environment—for specialized or proprietary information. The vendor may alter or update that information and then return it to the environment servers for storage and later retrieval, retrieval by other vendors, or retrieval and manipulation by the entities controlling the environment servers and the specialized information. Alternately, the transaction may be initiated by one of the environment servers seeking information from the vendor systems.

For example, one of multiple departments within an entity may seek a document or information available from one of various vendors with which the entity has ongoing relationships. To that end, the entity's information systems will communicate with the vendor's information systems, querying for that document or information, and the vendor's information systems will respond with that document or information. The information systems of the various vendors will, however, almost certainly be different. Consequently, the various information systems may require the queries in different formats or under different protocols, and the various information systems may provide the responsive document or information in different formats or under different protocols.

In another example, a vendor may seek to place an order for various parts or supplies from a supplier. To that end, the vendor's information systems will communicate with the supplier's information systems, seeking price and availability information of those parts or supplies. The supplier's information systems will respond with that information. Assuming price and availability are acceptable, the vendor's systems will then place the order, thus adding information to the supplier's systems. Another vendor may, either subsequently or contemporaneously, be engaged in the same set of transactions and communications with the supplier systems. The information systems of each of these vendors will almost certainly be different, providing information or requests in different formats and under different protocols.

The development process of B2B integrations, such as the exemplary integrations set forth above, is a complex process requiring multiple environments, including testing environments. The development process is designed to allow the eventual progress of the integration from development level to production-level.

The development process typically requires either (a) exposure of the environment servers to the internet and opening them up to many different connections and protocols or (b) the substitution of "canned," or predetermined communications, with the vendor systems. The first of these alternatives involves setting up accounts and connections with multiple third parties. This alternative incurs time and expense and creates the risk of exposing those environments to the internet. The second is ineffective because it does not adequately validate a production-level system integration in a realistic manner.

It is desirable, therefore, to provide a method or system for minimizing the costs and exposure risk while adequately validating a production-level system integration.

SUMMARY OF THE INVENTION

It is an object of this invention to provide a method or system for minimizing the costs and exposure risk while adequately validating a production-level system integration. A method and/or system for standardizing B2B integrations and the development of those integrations in a manner that minimizes the exposure risk and time and expense while validating production-level systems integration is provided.

A method and/or system for inserting a Vendor Gateway Server ("VGS") between environment servers and a vendor information system is provided. The environment server may be internal to the implementing system and the vendor information system may be external to the implementing system. The VGS may intercept information and requests between the internal environment and the external vendors. The VGS may store and look up specific information necessary for the routing of the transaction between the internal environment and the external vendors. The VGS may route the information and requests as appropriate in light of the specific information stored and retrieved.

An embodiment of the invention that uses a somewhat different model than the model listed above may involve multiple mortgage environment users. One of the users may request a title document from an external vendor system. The request may go initially to the VGS which may store information about the request. Such information may include the originating mortgage environment and a transaction identifier. Such information may also include format information and protocol information relating to the transmission and/or relating to the external vendor system. The VGS may then forward the request to the external vendor system.

When the vendor system responds to the request, that title document may be sent to the VGS. The VGS may then access the previously stored information including the originating mortgage environment. The VGS may then forward the requested title document to the originating mortgage environment user.

Some embodiments may include a system having an environment server. The environment server may be any server selected from the following list of servers: an operating environment server, a testing environment server, a secondary environment server, a backup environment server, a development environment server, a Q-and-A environment server and/or any other suitable server. The environment server may initiate information requests directed to remote systems. The system according to the invention may further include a gateway server. The gateway server may be configured to: receive the information requests; generate an identification tag to those requests; receive responses to the information requests; and associate the responses received to the information request using the identification tag.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
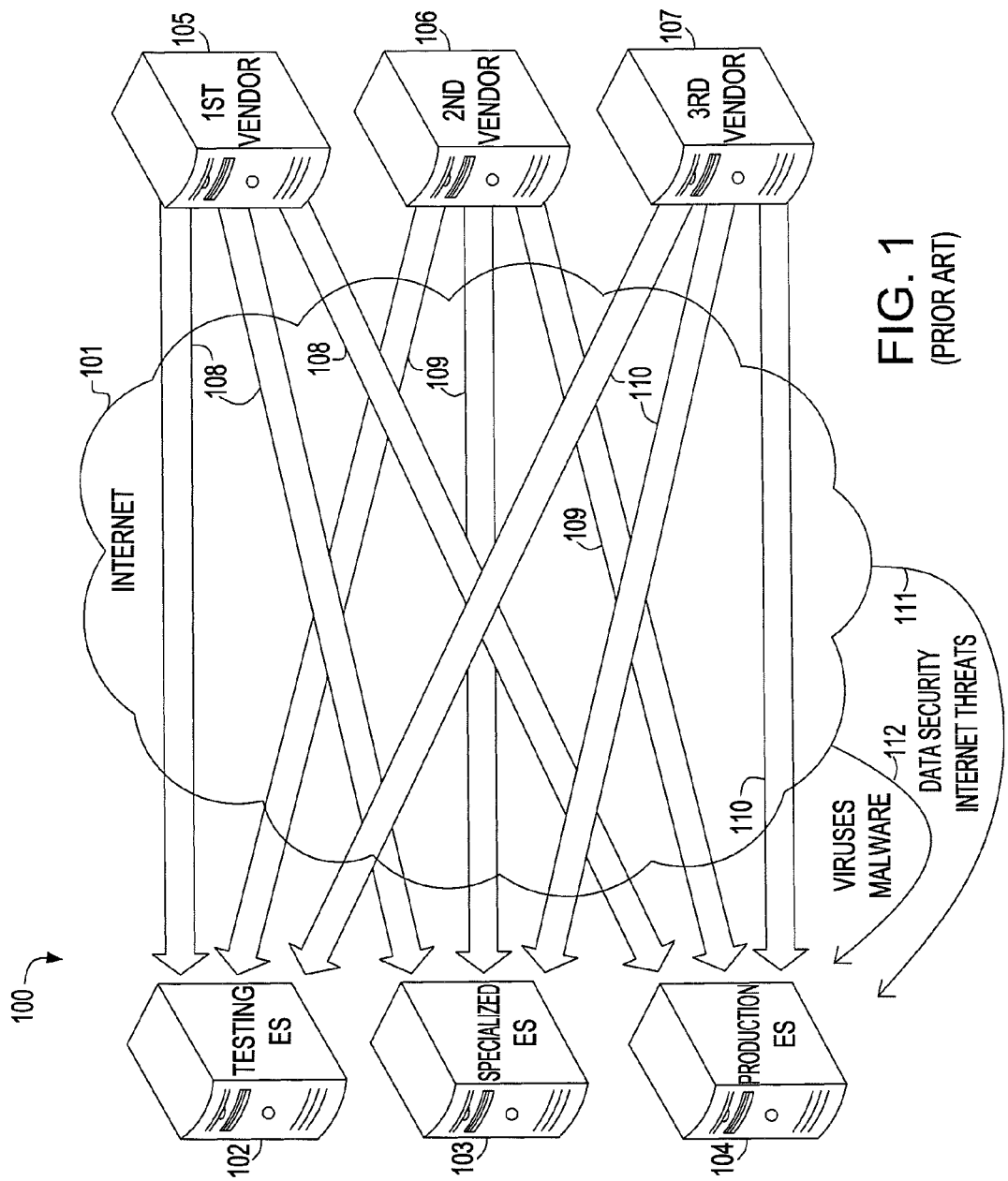
FIG. 1 is a schematic diagram of a conventional B2B integration.

Methods and systems for improving B2B integration are provided. B2B integration typically involves a Business Partner entity ("BP") and at least one external vendor information system. Typically, the information systems of the BP entity include at least one environment server. Such environment servers might include an operating environment server, a testing environment server, a secondary environment server, a backup environment server, a development environment server, a Q-and-A environment server, or any other environment server.

It should be understood that the term "server," for the purposes of this patent application, does not mean only a server as that term is typically understood in the computer industry but means any computer device (or devices) capable of performing in a functionally similar manner to a traditional server. In this respect "server" includes, for example, an individual computer, a particular component of an individual computer, or a network or distributed system of computers.

In some embodiments, the VGS is interposed between one or more of the BP environment servers and one or more of the vendor information systems. The VGS may intercept communications or information or requests between the BP environment servers and the vendor information systems, capturing certain information about the communications and in some instances routing the communications appropriately.

In some embodiments, the VGS so interposed may intercept a request for information originating from the BP environment server. The VGS may capture information including the originating environment server and the relevant data transfer protocol (e.g., HTTP, SOAP) used by the originating environment server.

In a system referred to herein as Key Vendor Field Names, different vendors refer to the same fields of information by different names. The VGS may be further pre-programmed with information relating to how a specific vendor identifies the fields. In a system referred to herein as Vendor Protocol Requirements, different vendors may require incoming communications subject to particular protocols or formats. The VGS may also be further pre-programmed with information relating to how a specific vendor requires regarding the protocol of incoming messages.

The VGS may store the information relating to a particular communication in association with a transaction identifier. The VGS may further modify the request to conform to any particular requirement of the particular vendor, as determined by the pre-programmed information. The VGS may transmit the modified request, together with the transaction identifier (referred to hereinafter as a, a "VG request packet"), to the target vendor information system.

In some embodiments, a vendor information system receiving a VG request packet may then send a response to that request back to the BP. Although the response may be ultimately directed to the originating environment server, the response may be received by the VGS. The VGS receiving such a response may parse the response for the transaction identifier and look up information about that response using its associated transaction identifier, including information identifying the originating environment server.

The VGS may be further pre-programmed with information about the environment server. Such pre-programmed information may include a table correlating Key Vendor Field Names to field names required by the environment server and including information about formats and protocols required by the originating environment server. The VGS may further modify the response to conform to any particular requirements of the originating environment server, as, for example, determined by the pre-programmed information. The VGS may transmit the modified response to the originating environment server.

Figure 2:
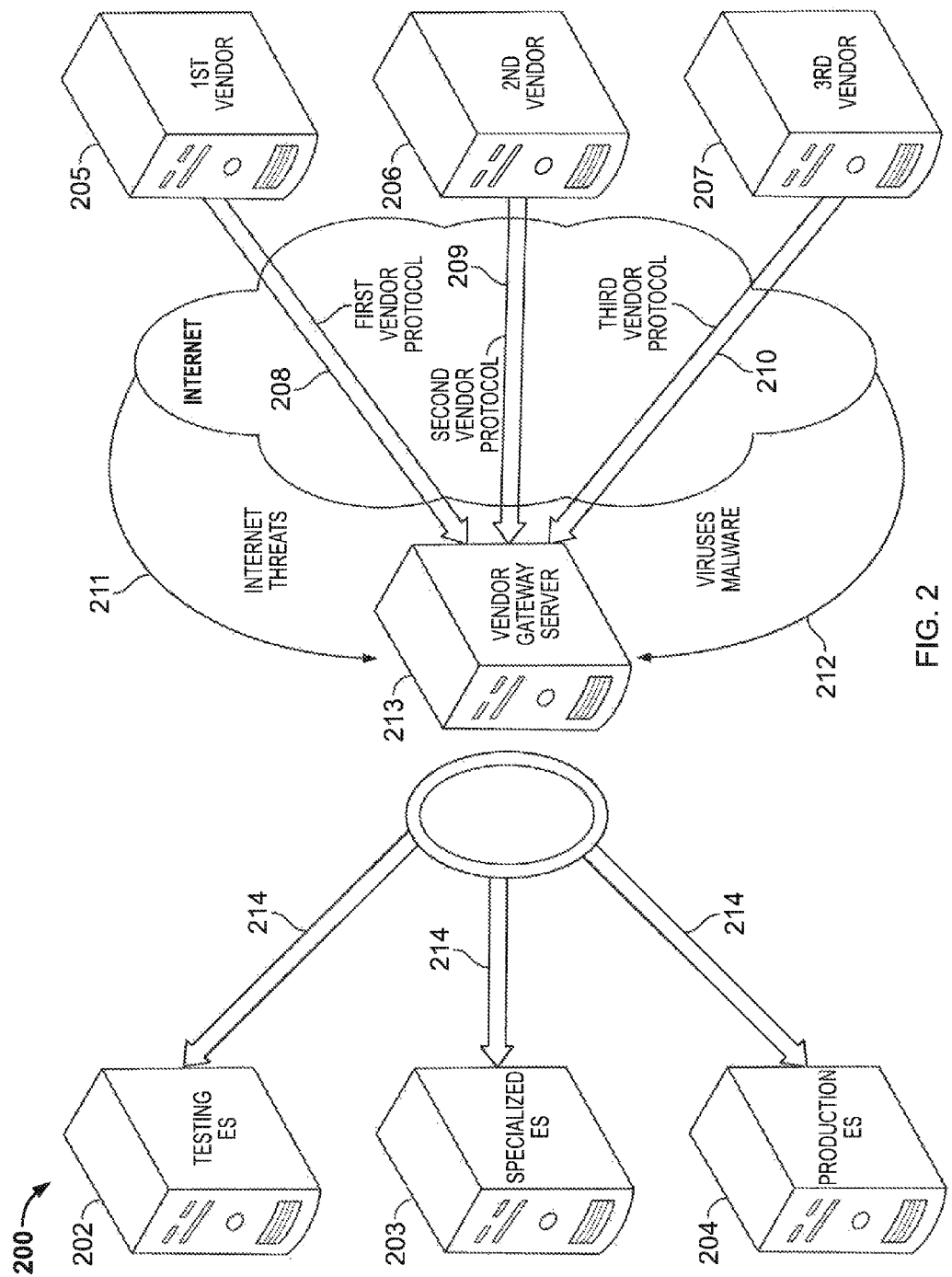
FIG. 2 is a schematic diagram of a B2B integration in accordance with the principles of the invention.
Figure 3:
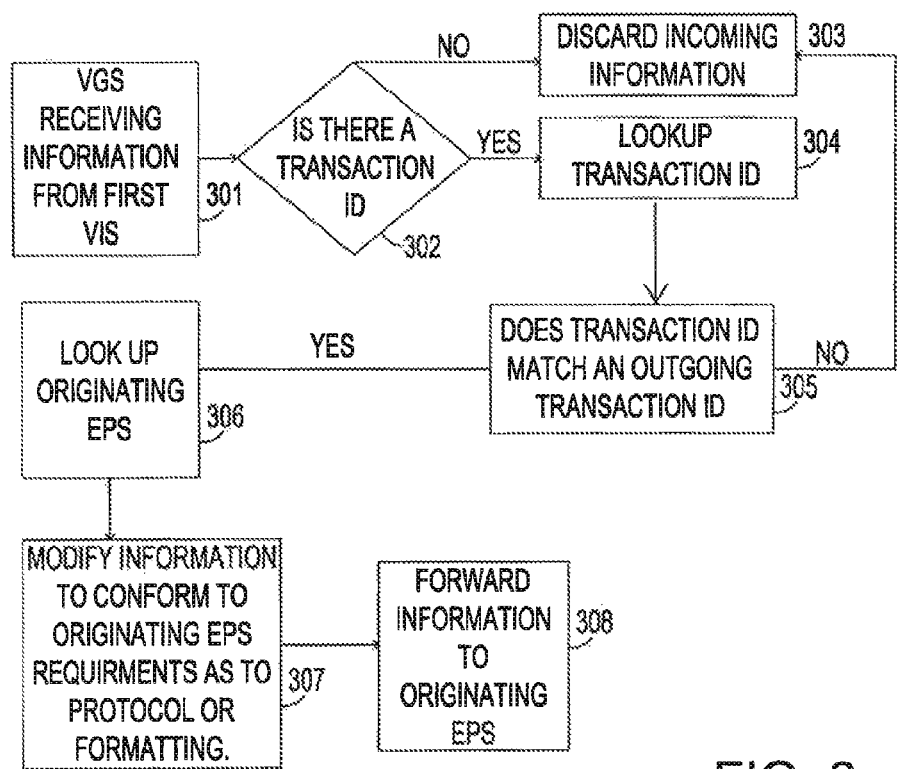
FIG. 3 is a flow diagram that shows a process that corresponds to a portion of the process shown in FIG. 2.
Figure 4:
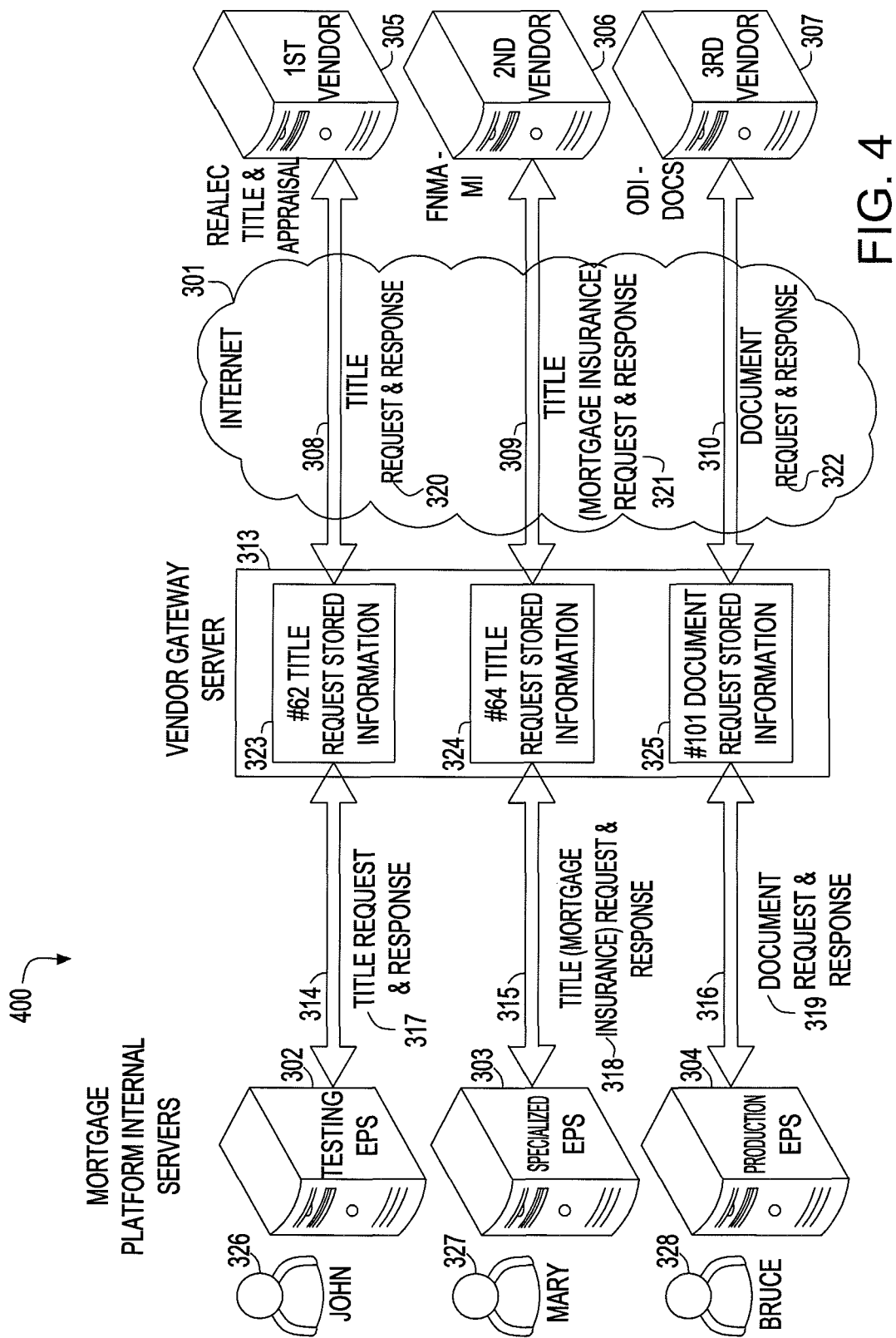
FIG. 4 is a schematic diagram of a B2B integration in accordance with the principles of the invention.

FIG. 1 shows a conventional system. FIGS. 2-4 show illustrative embodiments and features of the invention.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows a conventional B2B integration model 100. Conventional B2B integration model 100 may be based on Internet 101 or any suitable communication network. Testing environment platform server ("EPS") 102 may receive information from first vendor information system ("VIS") 105 using first vendor protocol 108, second VIS 106 using second vendor protocol 109, and third VIS 107 using third vendor protocol 110. Specialized EPS 103 may receive information, similarly, from first VIS 105, second VIS 106, and third VIS 107, each with their respective vendor protocols 108, 109, 110. Production EPS 104 may receive information from the three VIS's 105, 106, 107 using the respective vendor protocols 108, 109, 110. The three exemplary environment platform servers 102, 103, 104 may be exposed to Internet Data Security Threats 111, as well as Viruses and Malware 112.

FIG. 2 shows an illustrative B2B integration model 200 according to the principles of the invention. Illustrative B2B integration model 200 may be based on Internet 201 or any suitable communication network. Vendor Gateway Server 213 may receive information from first VIS 205 using first vendor protocol 208, second VIS 206 using second vendor protocol 209, and third VIS 207 using third vendor protocol 210. VGS 213 may parse the incoming information and look up necessary information, and then may direct the incoming information to the Testing EPS 202, Specialized EPS 203, or Production EPS 204 as appropriate. VGS 213 may communicate with EPS's 202, 203, 204 using a customized VGS-EPS protocol 214.

In system 200, only the VGS 213 is exposed to internet threats 211 and viruses and malware 212. The testing EPS, specialized EPS, and production EPS may not be directly exposed to the Internet 201.

FIG. 3 shows illustrative process 300 for receiving information from a vendor information systems 301, 302, and/or 303. At steps 304 and 305, a VGS 313 may look up a Transaction Identifier established by the VGS when an originating EPS made the initial communication requesting information from the VIS in question. At step 307, the VGS 313 modifies the incoming information in format and protocol to match the requirements of the originating EPS. The VGS 313 may do so by implementing pre-programmed conversions using Key Vendor Field Names, or specifics relating to Vendor Protocol Requirements, or any other suitable approach.

FIG. 4 shows illustrative process 400 for requesting and receiving information from vendor information systems. Illustrative process 400 may be based on Internet 401 or any suitable communication network. User John 326 on testing EPS 302 may seek information available from first VIS 305. Testing EPS 302 may originate a request by sending the request to the VGS 313. VGS 313 may use the pre-programmed protocols and formats required by the testing EPS 202. VGS 313 may assign transaction identification to the request and store information 323 associated with that request. VGS 313 may then forward the request to the first VIS 305 using the appropriate vendor protocol 308. Such protocol 308 may include transaction identification information 320.

The first VIS 305 may respond to the information request using the appropriate vendor protocol 308, including the transaction identification information 320. The first VIS 305 may send the response to the VGS 313. The VGS 313 may parse the response and determine the transaction identification information 320. The VGS may look up the stored transaction information 323 associated with that request. The VGS may then modify the response to conform to the testing EPS required protocol and format and then send that response to the Testing EPS 302 for access by end-user John 326.

Similarly, user Mary 327 on Specialized EPS 303 may seek information available from Second VIS 306, which may go through the VGS 313. The VGS 313 may store information 324 associated with the request and assign transaction identification 321. User Bruce 328 on Production EPS 304 may similarly seek information available from third VIS 307, which may similarly be processed through VGS 313.

Aspects of the invention have been described in terms of illustrative embodiments thereof. A person having ordinary skill in the art will appreciate that numerous additional embodiments, modifications, and variations may exist that remain within the scope and spirit of the invention.

One of ordinary skill in the art will appreciate that the apparatus features described herein and illustrated in the FIGS. may be arranged in other than the recited configuration and that one or more of the features may be optional. Also, the methods described herein and illustrated in the FIGS. may be performed in other than the recited order and that one or more steps illustrated may be optional. The above-referenced embodiments may involve the use of other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for improving B2B integration are provided. Persons skilled in the art will appreciate that the present invention can be practiced by other than the described embodiments, which are presented for purposes of illustration rather than of limitation, and that the present invention is limited only by the claims that follow.

What is claimed is:

1. A gateway server configured to:
   receive information requests from a plurality of environment platform servers on an intranet and communicating with a plurality of vendor information servers via the Internet, a first of the environment platform servers being an operating environment server utilizing a customized protocol, and a second of the environment platform servers being a testing environment server utilizing the customized protocol, wherein the testing environment server is utilized for validation of a first single protocol conversion and a second single protocol conversion prior to the utilization by the operating environment server of the first single protocol conversion and the second single protocol conversion;
   generate an identification tag for each information request received from each of a testing server that supports the testing environment and an operating server that supports the operating environment;
   receive a response to one or more of such information requests from at least one vendor information server, of the plurality of vendor information servers, conforming to at least one distinct vendor protocol, said vendor protocol being different from a plurality of vendor protocols and that is different from the customized protocol;
   using the identification tag, associate the response received to the information request to which the response is responsive;
   conform the response to the development environment associated with the server associated with the identification tag; and
   transmit the conforming response to the server which originated the information request associated with the response received,
   wherein:
   the gateway server performs the first single conversion from the distinct vendor protocol to the customized protocol and the second single conversion from the customized protocol to the distinct vendor protocol wherein the servers of the intranet are not directly exposed to the servers of the Internet.

2. The server of claim 1 further configured to forward the information request received to an IP address identified in the information request.

3. The server of claim 1 further configured to modify the information request to conform to receipt requirements and/or processing requirements of a system associated with an IP address identified in the information request.

4. The server of claim 1 further configured to modify the response received to conform to receipt requirements and/or processing requirements of the server that originated the information request associated with the response received.

5. A system comprising:
   an environment server which initiates information requests directed to remote systems, the environment server providing a platform for a testing development environment, wherein the testing development environment is utilized for validation of a first single protocol conversion and a second single protocol conversion prior to the utilization by a gateway server of the first single protocol conversion and the second single protocol conversion; and the gateway server being configured to:
receive the information requests utilizing a customized protocol on an intranet;
generate an identification tag to those requests;
receive responses to the information requests from a remote system using at least one distinct vendor protocol, said vendor protocol being different from a plurality of vendor protocols and that is different from the customized protocol, via the Internet;
associate the responses received to the information requests using the identification tag;
conform the responses to the testing development environment associated with the environment server;
transmit the conforming responses to the environment server by performing the first single conversion from the distinct vendor protocol to the customized protocol and the second single conversion from the customized protocol to the distinct vendor protocol wherein the servers of the intranet are not directly exposed to the servers of the Internet.

6. The system of claim 5 wherein the gateway server is further configured to forward the information requests to an IP address identified in the information requests.

7. The system of claim 5 wherein the gateway server is further configured to modify the information requests to conform to a receipt requirement of the system at an IP address identified in the information requests.

8. The system of claim 5 wherein the gateway server is further configured to modify each information request to conform to a receipt requirement at an IP address identified in the information request.

9. The system of claim 5 wherein the gateway server is further configured to modify the responses received to conform to a receipt requirement of the server which originated the information requests.

10. A method for communicating between a gateway server and a plurality of other servers, the method comprising:
integrating a testing environment into a business-to-business communication system a includes an operating environment by:
receiving information requests via a customized protocol from an operating server and a testing server that are among the plurality of other servers on an intranet, the operating server supporting the operating environment and the testing server supporting the testing environment, wherein the testing environment server is utilized for validation of a first single protocol conversion and a second single protocol conversion prior to the utilization by the operating environment server of the first single protocol conversion and the second single protocol conversion;
using the gateway server to generate an identification tag for each information request received from the operating server and the testing server;
receiving a response to each information request from a vendor information server via at least one distinct vendor protocol, said vendor protocol being different from a plurality of vendor protocols and that is different from the customized protocol, via the Internet;
using the identification tag to associate the response received to the information request to which the response is responsive;
conforming the response to a development environment associated with the environment server associated with the request; and
transmitting the conforming response to the environment server associated with the request by performing the first single conversion from the distinct vendor protocol to the customized protocol and the second single conversion from the customized protocol to the distinct vendor protocol wherein the servers of the intranet are not directly exposed to the servers of the Internet.

11. The method of claim 10 further comprising forwarding the information request received to an IP address identified in the information request.

12. The method of claim 11 wherein the forwarding of the information request occurs after the response received is associated with the information request.

13. The method of claim 10 wherein the transmitting occurs after the response received is associated with the information request to which the response is responsive.

14. The method of claim 10 further comprising modifying the information request to conform to receipt requirements at an IP address identified in the information request.

15. The method of claim 14 wherein the modifying occurs after the identification tag is generated.

16. The method of claim 10 further comprising modifying the response received to conform to receipt requirements by the server that originated the information request associated with the response received.

* * * * *